United States Patent Office 3,261,808
Patented July 19, 1966

3,261,808
LINEAR, HARDENABLE EPOXY POLYCARBONATES
Hermann Schnell, Krefeld-Uerdingen, and Heinrich Krimm, Krefeld-Bockum, Germany, assignors to Farbenfabriken Bayer Aktiengesellschaft, Leverkusen, Germany, a corporation of Germany
No Drawing. Filed Dec. 9, 1959, Ser. No. 858,339
Claims priority, application Germany, Dec. 13, 1958,
F 27,258
8 Claims. (Cl. 260—47)

This invention is concerned with hardenable mixtures of carbonates and polycarbonates and a process for their production.

It is known to react aromatic poly- and particularly di-hydroxy compounds, for example, hydroquinone, resorcinol, dihydroxydiphenyl, dihydroxy-diaryl-alkanes, ethers, sulphides, sulphones, sulphoxides and ketones, with, for example, alkenyl chlorocarbonic acid esters, such as allyl chlorocarbonic acid ester, in a molecular ratio of 1:2 to give the corresponding bis-alkenyl carbonates of the dihydroxy compounds. These unsaturated bis-carbonates are polymerisable and, therefore, hardenable by heating and, possibly, under the influence of catalysts. The polymerisation products are, as a result of very close cross-linking, very brittle since each carboxylic acid group corresponds to a polymerisable group. Furthermore, their adhesion to other materials is very low.

The high polymeric polycarbonates, on the other hand, which are obtainable by the reaction of aromatic dihydroxy compounds of the type mentioned, possibly in admixture with aliphatic or cycloaliphatic dihydroxy compounds, with derivatives of the carbonic acid, especially diesters and phosgene, in a molecular ratio of about 1:1, are thermoplastic, i.e. are not hardenable. As such they have outstanding properties for many fields of application whereas for other applications, for example, for the production of pressed articles, for the use as binding agents and cements and especially in lacquer technology where hardenable plastic materials are frequently preferred, these thermoplastic polycarbonates are less suitable. For their use as lacquer raw materials it must be particularly remembered that it is only possible to prepare comparatively dilute lacquer solutions with them as a result of their high solution viscosity. Even in the case of these polycarbonates, the adhesion to other materials does not satisfy all requirements.

By the present invention, the gap which has hitherto existed between the known hardenable monomeric and the non-hardenable highly polymeric polycarbonates is closed, the advantageous properties, particularly the hardness and the elasticity, the negligible taking up of water, the high resistance to saponification and the resistance to many chemicals remaining substantially unchanged and, in particular, good adhesion to other materials being obtained.

The new hardenable mixtures consist of carbonates according to the general Formula I

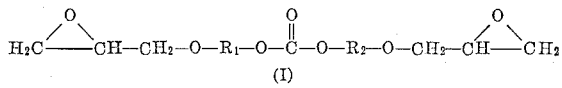
(I)

and of polycarbonates corresponding to the general Formulae II and III

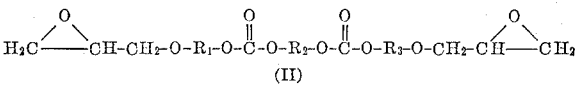
(II)

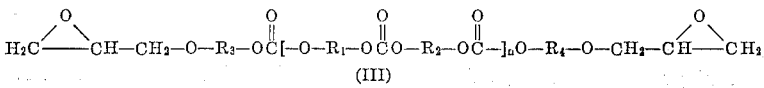
(III)

wherein $R_1$, $R_2$, $R_3$ and $R_4$ are divalent radicals selected from the group consisting of phenylene, naphthalyne, diphenylene, diphenylene alkanes, ethers, sulphides, sulphoxides, sulphones and ketones, alkylenes, cycloalkylenes, dialkylene phenylenes and dicycloalkylene alkanes, at least one of the radicals $R_1$ and $R_2$ being aromatic, and $n$ is a whole number from 1 to about 20.

According to their individual constitution, these epoxy polycarbonate mixtures are soft to hard, bright and clear resins but occasionally are somewhat opalescent due to crystallisation. The melts have low to average viscosities, give a low to average viscosity in comparatively concentrated solutions with a series of solvents, for example, methylene chloride, chloroform, ethylene chloride, benzene, toluene, dioxane, tetrahydrofurane, ethyl acetate, acetone, cyclohexanone and dimethyl formamide, and, by the addition of basic or acidic hardeners, for example, alkali metal hydroxides, amines, acid amines or polycarboxylic acids or acid anhydrides, at room temperature or at an elevated temperature can be converted into cross-linked, insoluble and non-melting products with outstanding properties. They are suitable, for example, as coating agents, particularly in the form of lacquers, as binding, adhesion and cement masses, as moulding resins and for the production of foamed materials.

The new mixtures are produced by reacting mixtures of carbonates and low and middle polymeric polycarbonates based upon aromatic dihydroxy compounds, possibly with a content of radicals of aliphatic and/or cycloaliphatic dihydroxy compounds with free hydroxy end groups of the general Formula IV, V and VI

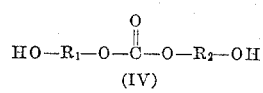
(IV)

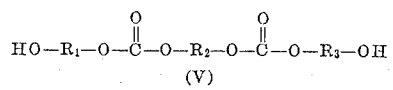
(V)

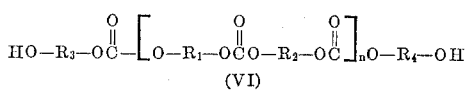
(VI)

with epichlorhydrin in the presence of an alkali metal hydroxide and a diluent, thereby producing low and middle polymeric polycarbonates with epoxy end groups being capable of cross-linking.

The mixtures of the carbonates and lower and middle polymeric linear polycarbonates with free hydroxyl end groups according to the Formulae IV, V and VI can be obtained by known methods by the reaction of carbonic acid derivatives, especially aliphatic or aromatic diesters of carbonic acid and phosgene, with a more or less large excess of aromatic dihydroxy compounds, if desired in admixture with aliphatic and cycloaliphatic dihydroxy compounds.

For the epoxidation of said mixtures it is possible and advantageous to maintain comparatively low temperatures of between about 20 and 80° C. In this way, the hydroxyl end groups of the carbonates and polycarbonates can be largely converted into intact epoxy end groups in contradistinction to the usual production of the known epoxy resins where the epoxidation generally takes place at temperatures between about 70 and 100° C. In this latter case, a more or less large number of the epoxy groups react further so that they are no longer available for a subsequent hardening of the resins.

We have also found that a particularly advantageous method of carrying out the process according to the invention consists in that the production of the mixtures of carbonates and low and middle polymeric polycarbonates by the phosgenisation process is carried out directly with the epoxidation. One or more aromatic dihydroxy compounds are dissolved in a known manner, if desired with the addition of a suitable amount of one or more aliphatic or cycloaliphatic dihydroxy compounds, in, for example, a tertiary amine, such as pyridine, or preferably in an aqueous solution of an alkaline metal hydroxide, expediently with the addition of an organic solvent, for example, methylene chloride, and phosgene passed in. At the same time, epichlorhydrin is added to the reaction mixture. In this case, too, temperatures between about 20 and 80° are particularly advantageous. In this manner, particularly uniform carbonates and lower and middle polymeric polycarbonates with epoxy end groups are obtained.

Among the initially mentioned aromatic dihydroxy compounds which are suitable for the production of polycarbonates, there may be particularly mentioned, by way of example, hydroquinone, 2,3,5,6-tetrachlorohydroquinone,
Resorcinol,
1,4-dihydroxynaphthalene,
2,6-dihydroxynaphthalene,
4,4'-dihydroxydiphenyl, Dihydroxydiphenyl alkanes, such as 4,4'-dihydroxydiphenylmethane,
1,1-(4,4'-dihydroxydiphenyl)-ethane,
1,2-(4,4'-dihydroxydiphenyl)-ethane,
1,1-(4,4'-dihydroxydiphenyl)-propane,
2,2-(4,4'-dihydroxydiphenyl)-propane,
2,2-(4,4'-dihydroxy-3,3',5,5'-tetrahydrochlorodiphenyl)-propane,
2,2-(2,2'-dihydroxy-5,5'-dimethyldiphenyl)-propane,
2,2-(4,4'-dihydroxydiphenyl)-butane,
1,1-(4,4'-dihydroxydiphenyl)-butane,
2,2-(4,4'-dihydroxydiphenyl)-pentane,
3,3-(4,4'-dihydroxydiphenyl)-pentane,
2,2-(4,4'-dihydroxydiphenyl)-heptane,
1,1-(4,4'-dihydroxydiphenyl)-cyclopentane,
1,1-(4,4'-dihydroxydiphenyl)-cyclohexane,
4,4'-dihydroxytriphenylmethane,
1,1,1-(4,4'-dihydroxytriphenyl)-ethane, furthermore the corresponding compounds of the type of 4,4'-dihydroxydiphenyl ether,
4,4'-dihydroxydiphenyl sulphide,
4,4'-dihydroxy-3,3'-dimethyl-diphenyl sulphide,
4,4'-dihydroxydiphenyl sulphoxide,
4,4'-dihydroxydiphenyl sulphone,
4,4'-dihydroxy-3,3'-dimethyl-diphenyl sulphone and
4,4'-dihydroxy-benzophenone.

Aliphatic and cycloaliphatic dihydroxy compounds which, if desired, may also be used are, for example, ethylene glycol, diethylene glycol, triethylene glycol, polyethylene glycol, thiodiglycol, ethylene dithioglycol, propane-1,3-diol, butane-1,3-diol, butane-1,4-diol, 2-methylpropane - 1,3 - diol, pentane-1,5-diol, 2-ethylpropane-1,3-diol, hexane-1,6-diol, octane-1,8-diol, 2-ethylhexane-1,3-diol, decane-1,10-diol, quinite cyclohexane-1,2-diol, o, m- and p-xylylene glycol, 2,2-(4,4'-dihydroxydicyclohexyl)-propane, 4,4'-dihydroxydicyclohexylmethane and 2,6-dihydroxydecahydronaphthalene.

The following examples are given for the purpose of illustrating the invention, the parts by weight and the parts by volume being in the relationship of grams to millilitres:

*Example 1*

A mixture of 228 grams 2,2-(4,4'-dihydroxydiphenyl)-propane, 143 grams diphenyl carbonate and 20 milligrams of the sodium salt of dihydroxydiphenyl propane is heated with stepwise increase of the temperature from 155° C.– 250° C. and reduction of the pressure from 100 to 12 mms. mercury gauge until 130 grams phenol have been split off. A yellowish, low molecular weight polycarbonate with a softening point of 90–95° C. is obtained.

73.5 grams of this polycarbonate are dissolved in a mixture of 100 cm.$^3$ methylene chloride and 100 cm.$^3$ 2 N sodium hydroxide solution and reacted at 40–45° C. with 12 grams epichlorhydrin. After a reaction time of four hours, the aqueous layer is separated off, the non-aqueous layer neutralised with dilute acetic acid, dried over anhydrous sodium sulphate and evaporated. A yellowish resin with a softening point of 80–85° C. and an epoxide number of 1.22 is obtained. By heating with 0.2 parts phthalic acid anhydride to 170° C., an insoluble and non-meltable tough product is obtained.

*Example 2*

A solution of 57 grams 2,2-(4,4'-dihydroxydiphenyl)-propane in 375 cm.$^3$ 2 N sodium hydroxide solution is mixed with 100 cm.$^3$ methylene chloride and warmed to 40° C. 24.75 grams phosgene are passed into the solution in the course of 1½ hours while, at the same time, 18.5 grams epichlorohydrin are added dropwise. Subsequently, a temperature of 42° C. is maintained for a period of three hours. The aqueous layer is then separated off, the non-aqueous layer diluted with methylene chloride and shaken up with dilute acetic acid until slightly acidic. After drying over anhydrous sodium sulphate and evaporation of the solvent, a clear, bright resin with a softening point of 80–85° C. and an epoxide number of 1.90 is obtained. If the resin is heated with 0.3 part phthalic acid anhydride for one hour at 170° C. then there results a non-meltable and insoluble product.

*Example 3*

14.85 grams phosgene are passed within a period of 1½ hours into a solution of 57 grams 2,2-(4,4'-dihydroxydiphenyl)-propane in 300 cm.$^3$ 2 N sodium hydroxide solution, to which has been added 100 cm.$^3$ methylene chloride, heated at a temperature of 40° C. while, at the same time, 18.5 grams epichlorhydrin are gradually added thereto. After warming for a further three hours at 40° C., the aqueous layer is separated off, the non-aqueous layer diluted with methylene chloride and made slightly acidic with dilute acetic acid. The methylene chloride solution is then dried over anhydrous sodium sulphate and evaporated. A clear bright resin with a softening point of 77–82° C. is obtained. It has an epoxide number of 2.06 and contains 14.5 percent carbonate. By heating for one hour with 8.3 parts phthalic acid anhydride to 160° C. an insoluble and non-meltable product is obtained.

*Example 4*

24.75 grams phosgene are passed at 40° C. within a period of 45 minutes into a solution of 64 grams 2.2-(4,4'-dihydroxydiphenyl)-butane in 375 cm.$^3$ 2 N sodium hydroxide solution, to which has been added 100 cm.$^3$ methylene chloride, while 18.5 grams epichlorhydrin are added dropwise at the same time. After a reaction period of three hours at 50° C., the aqueous layer is separated off, the non-aqueous layer made weakly acidic with dilute acetic acid, dried over anhydrous sodium sulphate and evaporated. A crystalline product with a melting point of 178–183° C. and an epoxide number of 1.65 is obtained. After the addition of a few milligrams of the sodium salt of 2,2-(4,4'-dihydroxydiphenyl)-propane, it can be hardened to an insoluble and non-meltable hard product by heating for one hour at 170° C.

*Example 5*

24.75 grams phosgene are passed within a period of 45 minutes at 40° C. into a solution of 61.5 grams 4,4'-dihydroxy-3,3'-dimethyl-diphenyl-sulphide in 375 cm.$^3$ 2 N sodium hydroxide solution, to which has been added 100 cm.³ methylene chloride, while at the same time 18.5 grams epichlorhydrin are added dropwise. After a reaction time of three hours at 60° C., the aqueous layer is separated off, the non-aqueous layer rendered weakly acidic with dilute acidic acid, dried over anhydrous sodium sulphate and evaporated. A yellowish resin of melting point 93–99° C. and an epoxide number of 0.9 is obtained. After the addition of a few milligrams of the sodium salt of 2,2-(4,4′-dihydroxy-diphenyl)-propane and heating for one hour at 170° C., it can be hardened to an insoluble and non-meltable product.

We claim:

1. The resinous product obtained by reacting (1) phosgene, (2) epichlorohydrin and (3) a dihydric phenol at the same time.

2. The resinous reaction product of claim 1 wherein said dihydric phenol is 2,2-(4,4′-dihydroxydiphenylene)-propane.

3. The resinous reaction product of claim 1 wherein said dihydric phenol is 2,2(4,4′-dihydroxydiphenylene)-butane.

4. The resinous reaction product of claim 1 wherein said dihydric phenol is 4,4′-dihydroxy-3,3′-dimethyl-diphenylene sulphide.

5. The resinous reaction product of claim 1 wherein said dihydric phenol is selected from the group consisting of dihydroxy phenylenes, dihydroxy naphthalenes, dihydroxy diphenylenes, dihydroxy diphenylene alkanes, dihydroxy phenylene ethers, dihydroxy phenylene sulphides, dihydroxy phenylene sulphoxides, dihydroxy phenylene sulphones and dihydroxy phenylene ketones, and mixtures of such aromatic dihydroxy compounds with dihydroxy alkanes, dihydroxy cycloalkanes, dihydroxy alkyl phenylenes and dihydroxy-cycloalkylene alkanes.

6. The process which comprises adding (1) phosgene and (2) epichlorohydrin at the same time to at least one dihydric phenol in the presence of a basic diluent selected from the group consisting of tertiary amines and aqueous alkaline metal hydroxide and at a temperature between about 20 and 80° C.

7. The process of claim 6 wherein said dihydric phenol is selected from the group consisting of dihydroxy phenylenes, dihydroxy naphthalenes, dihydroxy diphenylenes, dihydroxy diphenylene alkanes, dihydroxy phenylene ethers, dihydroxy diphenylene alkanes, dihydroxy phenylene ethers, dihydroxy phenylene sulphides, dihydroxy phenylene sulphoxides, dihydroxy phenylene sulphones and dihydroxy phenylene ketones, and mixtures of such aromatic dihydroxy compounds with dihydroxy alkanes, dihydroxy cycloalkanes, dihydroxy alkyl phenylenes and dihydroxycycloalkylene alkanes.

8. The process of claim 6 wherein an organic solvent selected from the group consisting of methylene chloride, chloroform, ethylene chloride, benzene, toluene, dioxane, tetrahydrofurane, ethyl acetate, acetone, cyclohexanone and dimethylformamide, is added to the reaction mixture.

References Cited by the Examiner

UNITED STATES PATENTS

| 2,444,333 | 6/1948 | Castan | 260—47 |
| 2,592,560 | 4/1952 | Greenlee | 260—47 |
| 2,795,572 | 6/1957 | Mueller et al. | 260—77 |

OTHER REFERENCES

Schnell, Angewandte Chemie, 68 (No. 20), 633–660 (1956).

WILLIAM H. SHORT, *Primary Examiner.*

MILTON STERMAN, PHILLIP E. MANGAN,
*Examiners.*

T. D. KERWIN, A. L. LIBERMAN, J. C. MARTIN,
*Assistant Examiners.*